United States Patent
Wang

(10) Patent No.: US 9,135,179 B2
(45) Date of Patent: Sep. 15, 2015

(54) SYSTEM AND METHOD OF ARBITRATING CACHE REQUESTS

(71) Applicant: QUALCOMM Incorporated, San Diego, CA (US)

(72) Inventor: Chunlin Wang, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 268 days.

(21) Appl. No.: 13/928,169

(22) Filed: Jun. 26, 2013

(65) Prior Publication Data

US 2014/0331012 A1 Nov. 6, 2014

Related U.S. Application Data

(60) Provisional application No. 61/818,358, filed on May 1, 2013.

(51) Int. Cl.
*G06F 12/08* (2006.01)
(52) U.S. Cl.
CPC .......... *G06F 12/0855* (2013.01); *G06F 12/084* (2013.01); *G06F 2212/302* (2013.01)
(58) Field of Classification Search
CPC .............. G06F 12/084; G06F 12/0855; G06F 2212/302
See application file for complete search history.

(56) References Cited

U.S. PATENT DOCUMENTS

| | | | |
|---|---|---|---|
| 6,385,678 B2 | 5/2002 | Jacobs et al. | |
| 6,778,175 B2 | 8/2004 | Yeh et al. | |
| 7,365,752 B2 | 4/2008 | Xie | |
| 8,314,807 B2 | 11/2012 | Biswas et al. | |
| 2006/0090046 A1 | 4/2006 | Surti et al. | |
| 2008/0091883 A1 | 4/2008 | Cox et al. | |
| 2012/0059962 A1 | 3/2012 | Lai | |

OTHER PUBLICATIONS

Radeon X1800 Memory Controller, Technology White Paper, ATI Technologies, Inc., 2005. 11 Pages.
International Search Report and Written Opinion—PCT/US2014/034210—ISA/EPO—Aug. 6, 2014.

*Primary Examiner* — Yong Choe
(74) *Attorney, Agent, or Firm* — Knobbe Martens Olson & Bear LLP

(57) ABSTRACT

This disclosure relates to arbitration of different types of requests to access a cache. Features of this disclosure can be implemented in a graphics processing unit (GPU). In one embodiment, an arbiter can receive requests from a color processor and a depth processor and determine which of the received requests has the highest priority. The request with the highest priority can then be provided to the cache. The priority can be configurable. The arbiter can determine priority, for example, based on whether a location in the cache associated with a request is available, a weight associated with the request, a number of requests of a particular type processed by the arbiter, or any combination thereof.

22 Claims, 4 Drawing Sheets

SYSTEM AND METHOD OF ARBITRATING CACHE REQUESTS

RELATED APPLICATION

This application claims the benefit of priority under 35 U.S.C. §119(e) of U.S. Provisional Patent Application No. 61/818,358, filed May 1, 2013, titled "DEPTH/COLOR REQUEST ARBITRATION," the disclosure of which is hereby incorporated by reference in its entirety herein.

BACKGROUND

1. Technical Field

Embodiments of the invention generally relate to electronics, and, in particular, to arbitration of cache requests.

2. Description of the Related Technology

As mobile devices, such as smart phones, are being used for a wide variety of purposes, processors for mobile devices are being designed with increasing capabilities. For instance, processors for mobile devices can include several components with separate functionalities, such as a central processing unit (CPU), a graphics processing unit (GPU), a digital signal processor (DSP), etc. GPUs are widely used to render two-dimensional (2D) and three-dimensional (3D) images for various applications. GPUs can be used to render still images and/or video images.

To render images, GPUs can include a color processor and a depth processor. The color processor can process image data and generate color data indicating colors of pixels of a scene to be rendered on a display. The depth processor can process the image data and generate depth data indicating distance values for pixels in the scene. The color processor and the depth processor can share a memory to store the color data and the depth data. When there are multiple requests to access the shared memory, an order in which requests are processed can be based on arbitration. Existing methods of arbitrating between requests to access the shared memory have resulted in suboptimal performance and bottlenecks in a GPU pipeline.

SUMMARY OF CERTAIN INVENTIVE ASPECTS

One aspect of this disclosure is an apparatus that includes a cache and an arbiter. The cache is configured to store data. The arbiter includes electronic hardware. The arbiter is configured to assign weights to different types of cache requests based on data received by the arbiter. The different types of cache requests include at least a first type of cache request and a second type of cache request. The arbiter is also configured to receive a first request to access the cache from a depth processor. The first request is the first type of cache request. The arbiter is also configured to receive a second request to access the cache from a color processor. The second request is the second type of cache request. The arbiter is configured to determine which of the received requests has a highest priority based at least partly on the weights associated with the first type of request and the second type of request. The arbiter is further configured to provide the cache with the received request determined to have the highest priority.

Another aspect of this disclosure is an apparatus that includes a cache configured to store data and arbitration means for determining a relative priority of different types of cache requests based at least partly on weights associated with the different types of cache requests and counts of requests of the different types of cache requests. The arbitration means is configured to provide the different types of cache requests to the cache based on the relative priority. The apparatus also includes a color processor configured to provide cache requests to the arbitration means and a depth processor configured to provide cache requests to the arbitration means.

Another aspect of this disclosure is an electronically-implemented method of providing a selected cache request to a cache. The method includes: receiving, from a depth processor and from a color processor, a plurality of different types of cache requests to access a cache shared by the depth processor and the color processor; determining a selected cache request of received cache requests has a highest priority of the received cache requests based at least partly on one or more weights associated with the different types of cache requests and one or more counts associated with the different types of cache requests; and providing the selected cache request to the cache prior to providing other cache requests of the received cache request to the cache.

Another aspect of this disclosure is non-transitory computer-readable storage including instructions that, when executed, direct a graphics processing unit to perform a method. The method includes selecting, based at least partly on weights associated with different types of cache requests and counts associated with the different types of cache requests, a cache request from a plurality of the different types of cache requests to access a cache, in which the different types of cache requests are provided by a color processor and a depth processor; and providing the selected cache request to the cache.

For purposes of summarizing the disclosure, certain aspects, advantages and novel features of the inventions have been described herein. It is to be understood that not necessarily all such advantages may be achieved in accordance with any particular embodiment of the invention. Thus, the inventions may be embodied or carried out in a manner that achieves or optimizes one advantage or group of advantages as taught herein without necessarily achieving other advantages as may be taught or suggested herein.

BRIEF DESCRIPTION OF THE DRAWINGS

To avoid repetition of description, components having the same or similar function may be referenced by the same reference number.

DETAILED DESCRIPTION OF CERTAIN EMBODIMENTS

Figure 1:
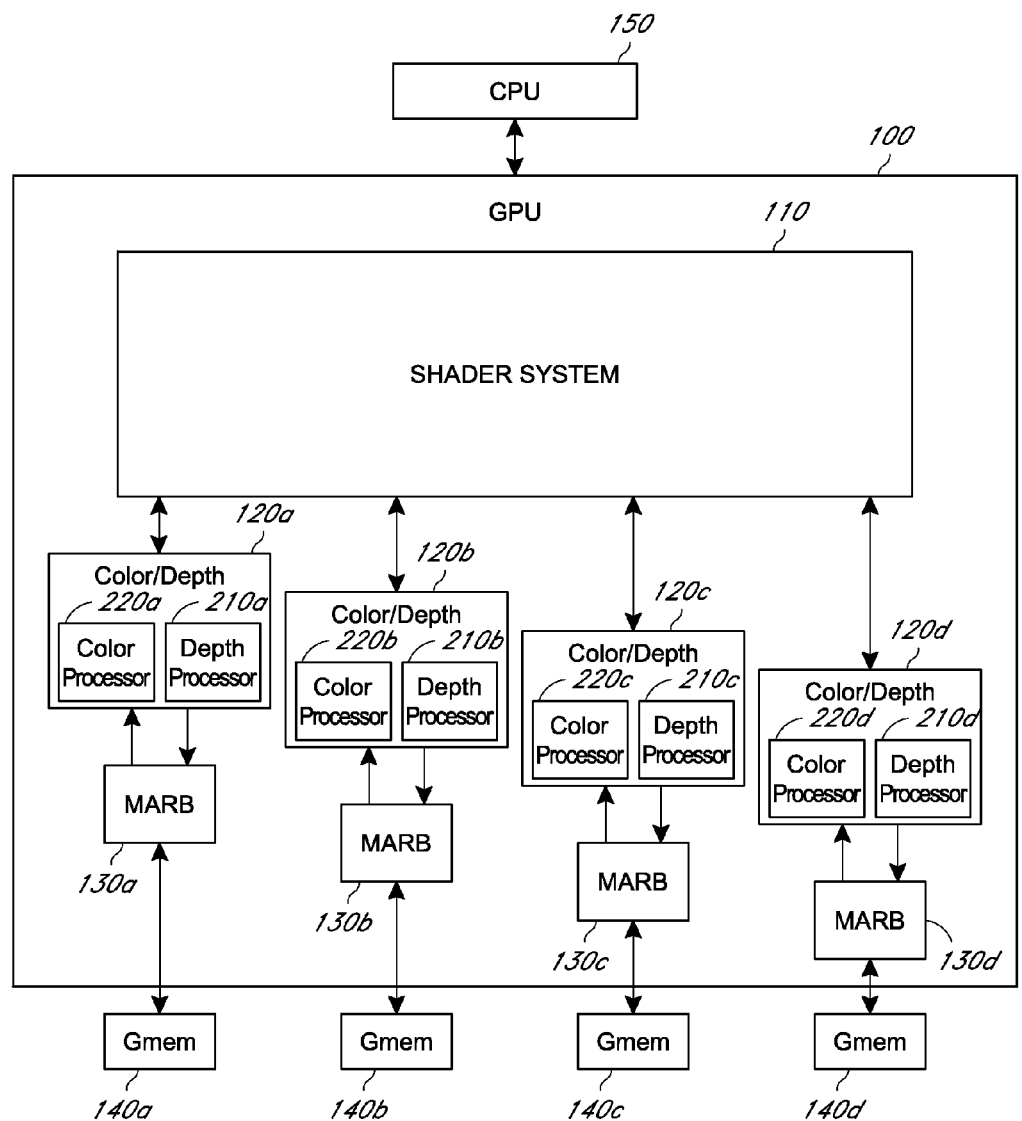
FIG. 1 is a schematic block diagram of an illustrative graphics processing unit.

Although particular embodiments are described herein, other embodiments, including embodiments that do not provide all of the benefits and features set forth herein, will be apparent to those of ordinary skill in the art.

Generally described, aspects of this disclosure relate to arbitration between depth and color requests to access a shared cache. An arbiter can receive depth requests, such as a depth write and a depth read, from a depth processor and color requests, such as a color write and a color read, from a color processor. The arbiter can have a configurable priority among the various requests to the shared cache. As such, the priority among the various requests can be adjusted to increase performance of a system.

Embodiments of the arbiters described herein can have configurable weights for determining priority among various types of cache requests. These weights can be programmed by a driver and/or by hardware. Such arbiters can provide requests to a shared cache in an order based on the relative priority among different types of cache requests in order to efficiently use the shared cache and/or to avoid bottlenecks in a pipeline. In some instances, the relative priority between different types of cache requests can remain the same even when one or more of the different types of cache requests are not received by the arbiter for a relatively long period of time or relatively infrequently compared to other types of cache requests (for example, 20 cache requests without receiving a particular type of cache request). A cache request queue may not be needed according to certain implementations.

Arbitration of cache requests can be determined based on an availability of a location in the shared cached. The priority can be determined based on comparing count value of counters for particular types of cache requests with respective weights stored in weight registers for particular types of cache requests. When one or more conditions are detected, the counters for particular types of cache requests can be cleared.

Particular implementations of the subject matter described in this disclosure can be implemented to realize one or more of the following potential advantages, among others. The relative priority of different types of cache requests can be configured based on different scenes to achieve better performance. Cache requests with available destination locations can be served before other cache requests without available destination locations when possible, in order to achieve better performance. The arbitration schemes described herein can maintain appropriate priority ratings of different types of cache requests even if one or more types of cache requests are not received for a relatively long time. The arbiters described herein can be implemented with a relatively small amount of hardware. For instance, one example arbiter can assign priority to four different types of cache request with only 24 one bit flip-flops. In this example, the arbiter can consume less than about 1,000 $\mu m^2$ of area. The arbiters described herein can be implemented at a relatively high speed. For instance, a longest path in the arbiter can be traversed in about 500 picoseconds or less when operating with a power supply voltage of 0.855 v in a 28 nanometer process technology.

In some embodiments, the systems and apparatus described herein include an integrated circuit, such as a graphic processing unit (GPU), to implement one or more features described herein. One non-limiting example of such a graphics processing unit is the ADRENO® integrated graphics solution that is part of the SNAPDRAGON® line of chipsets offered from Qualcomm of San Diego, Calif. In these embodiments, the GPU may include a memory having stored instructions for carrying out the one or more of the functionalities described herein.

FIG. 1 is a schematic block diagram of an illustrative graphics processing unit (GPU) 100. Such a GPU can be included on an integrated circuit designed for a smart phone, for example. The illustrated GPU 100 includes a shader system 110, color/depth blocks 120a-120d, and memory arbitration (MARB) blocks 130a-130d. It will be understood that the GPU 100 can include more or fewer blocks than illustrated. The GPU 100 can be in communication with graphics memory (Gmem) 140a-140d that is external to the GPU. The GPU 100 can be in communication with a central processing unit (CPU) 150. The Gmem 140a-140d and/or the CPU 150 can be included in a chipset or a processor that includes the GPU 100.

The shader system 110 can process graphics data to produce appropriate levels of light and/or color in an image to be rendered. The shader system 110 can adjust position, hue, saturation, brightness, contrast, the like, or any combination thereof of some or all of an image to be rendered. The shader system 110 can provide image data to the color/depth blocks 120a-120d.

Each color/depth block 120a-120d includes a color processor 220a-220d and a depth processor 210a-210d. The color processors 220a-220d can process image data and generate color data indicating colors of pixels of a scene to be rendered on a display. The depth processors 210a-210d can process the image data and generate depth data indicating distance values for pixels in the scene. The depth processor and the color processor can be implemented by any suitable circuitry. The depth processor can be separate from the color processor in some embodiments. While the depth processor and the color processor implement different functionalities, in certain embodiments these processors can share some common circuitry. Each of the color/depth block 120a-120d can correspond to a different portion of a display. For instance, the display can be divided into four quadrants and each of the color/depth blocks 120a-120d can correspond to one of the four quadrants. While the GPU 100 shown in FIG. 1 includes 4 color/depth blocks 120a-120d each corresponding to a different portion of a display, it will be understood that any suitable number of color/depth blocks can be implemented in a GPU for a particular application. For instance, a single color/depth block can be implemented in certain applications. In some implementations, one MARB block can be shared among more than one RB block.

As illustrated in FIG. 1, each color/depth block 120a-120d can be in communication with a respective MARB block 130a-130d. In some other implementations, two or more of the color/depth blocks 120a-120d can be in communication with a single MARB block 130a. Each MARB block includes an arbiter and a cache. The data from the cache of a MARB block 130a can be provided to Gmem 140a. In FIG. 1, each MARB block 130a-130d includes an arbiter and a cache.

Figure 2:
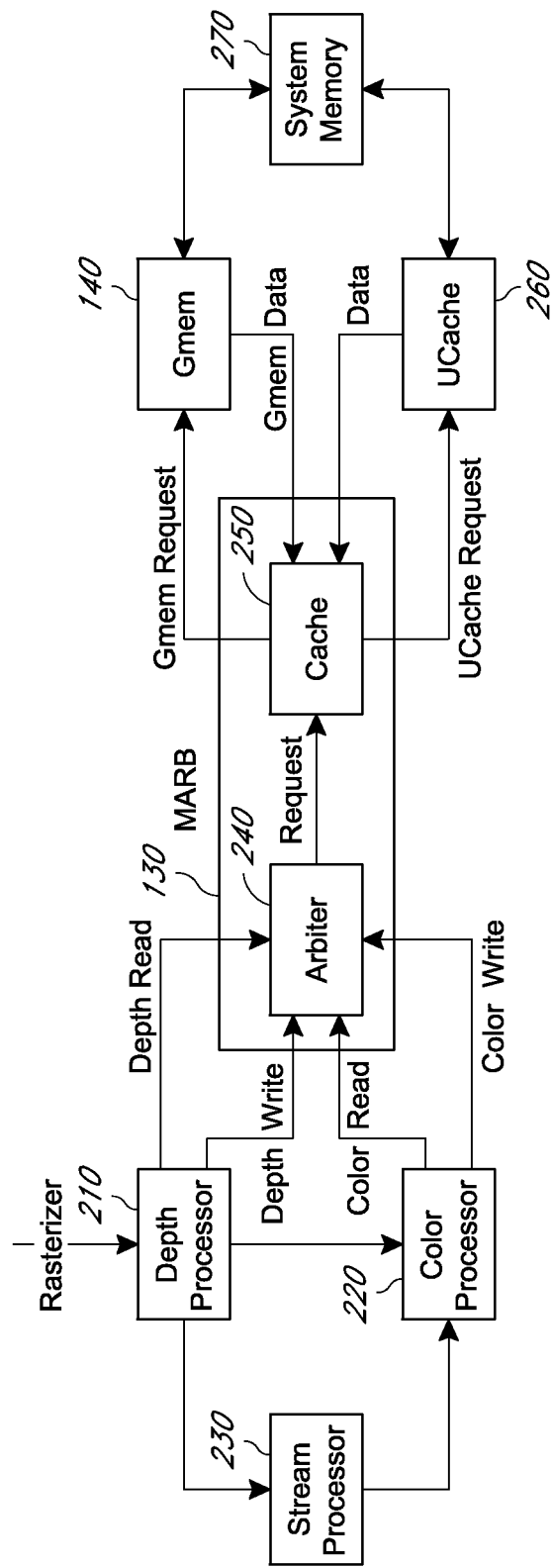
FIG. 2 is a schematic block diagram that includes an illustrative arbiter configured to receive cache requests from depth and color processors and to provide cache requests to a cache, according to an embodiment.

FIG. 2 is a schematic block diagram that illustrates a data flow to and from an arbiter and a cache included in a MARB block 130. The MARB block 130 can be one of the MARB blocks 130a-130d from FIG. 1. Data from a rasterizer can be provided to a depth processor 210. The depth processor 210 can generate depth read requests and depth write requests to access the cache 250. The depth processor 210 can provide the depth read requests and the depth write requests to an arbiter 240. A color processor 220 can receive data from the depth processor 210. In certain implementations, the color processor 220 can receive some data from the depth processor 210 via a stream processor 230. The color processor 220 can generate color read requests and color write requests to access the cache 250. The color processor 220 can provide color read requests and color write requests to the arbiter 240. The depth processor 210 and the color processor 220 can be included in one of the color/depth blocks 120a-120d of FIG. 1.

The arbiter 240 can receive cache requests from the depth processor 210 and the color processor 220 and provide cache requests to the cache 250. The cache 250 can be shared by the depth processor 210 and the color processor 220. Both the depth processor 210 and the color processor 220 can each send read and write requests to the cache 250. Accordingly, in certain embodiments, 4 different types of cache requests can be provided to the cache 250: a depth read, a depth write, a color read, and a color write.

In a graphics pipeline, depth instructions can be prioritized above color instructions. A depth read or a depth write request to the cache could be blocked if a corresponding color request has not been served. When depth requests have not been sufficiently served, bottlenecks, in which idle instructions are executed, can occur in a pipeline. As such, the arbiter 240 can determine which request to provide to the cache 250 first when there are multiple cache requests, in order to achieve a higher performance in comparison to devices that do not institute such a procedure.

The arbiter 240 can receive different types of cache requests from one or more depth processors 210 and one or more color processors 220 and determine which of the received requests has a highest priority. For instance, the arbiter 240 can receive two or more of a depth read, a depth write, a color read, and a color write and determine which request has the highest priority. Then the cache request with the highest priority can be provided by the arbiter 240 to the cache 250 before the other received requests are provided to the cache 250. The arbiter 240 can receive multiple inputs and generate a single output to provide a selected cache request to the cache 250 at a particular point in time. Each of the multiple inputs of the arbiter 240 can correspond to a different type of cache request. For example, as illustrated in FIG. 2, four inputs of the arbiter 240 can correspond to a depth read, a depth write, a color read, and a color write, respectively. The priority of the requests can be configurable.

The arbiter 240 can check an availability of a location in the cache 250 associated with the received cache requests in determining which cache request has the highest priority. For instance, if cache information received from the cache 250 indicates that a location of the cache 250 associated with a selected cache request is not available, the selected cache request can be determined to have a lower priority. A cache location may not be available when data other than the requested data is stored in the location and/or when valid data is not stored in the cache location.

As illustrated, the arbiter 240 can provide a single request to the cache 250 at a time. The cache 250 can also interface with a Gmem 140, which can be one of the Gmems 140a-140d of FIG. 1, and a unified cache (Ucache) 260. The cache 250 can provide a Gmem request to the Gmem 140 and receive Gmem data from the Gmem 140. Similarly, the cache 250 can provide a Ucache request to the Ucache 260 and receive Ucache data from the Ucache 260. The Gmem 140 and the Ucache 260 can each be in communication with a system memory 270.

Figure 3:
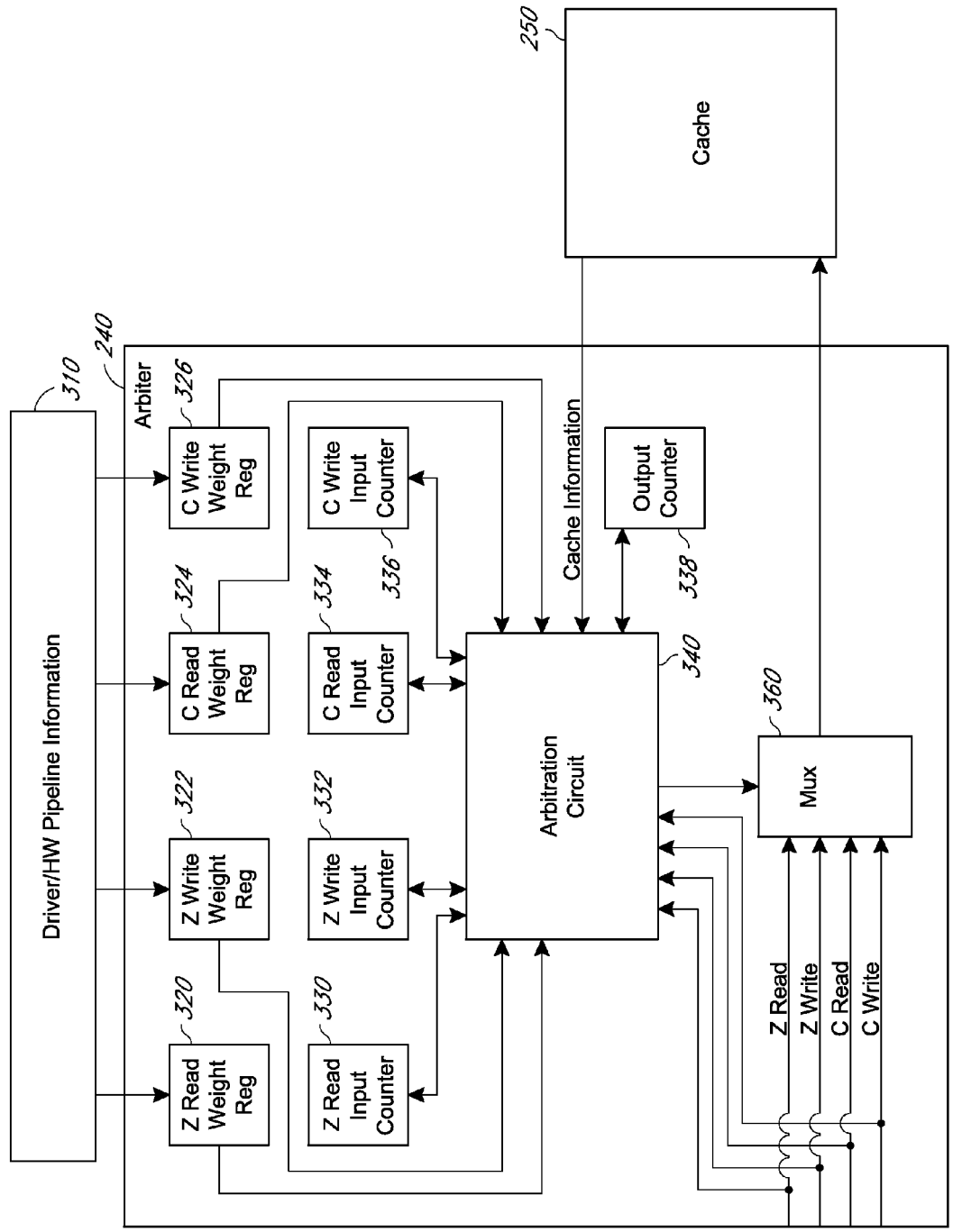
FIG. 3 is a schematic block diagram of an illustrative arbiter, according to an embodiment.

FIG. 3 is a schematic block diagram of an illustrative example of an arbiter 240, according to an embodiment. In FIG. 3, "Z" refers to depth and "C" refers to color. The arbiter 240 is configured to receive different types of cache requests, including depth read (Z read), depth write (Z write), color read (C read), and color write (C write) and provide a selected request of the different types of cache requests based on the relative priority of the different types of cache requests. The arbiter 240 comprises electronic hardware and can be implemented by any suitable circuitry, such as digital circuits. The arbiter 240 can include weight registers 320-326, input counters 330-336, an output counter 338, an arbitration circuit 340, and a multiplexer 360. It will be understood that the arbiter 240 can include more or fewer components than illustrated in some implementations.

The arbiter 240 can include a weight register for each type of cache request. For example, as shown in FIG. 3, weight registers include a depth read weight register 320, a depth write weight register 322, a color read weight register 324, and a color write weight register 326. Each of the weight registers can include one or more weights from which the relative priority of a particular type of cache request can be determined. The weight registers are configurable and can be configured in a variety of ways. For example, the weight(s) of a particular weight register can be configured by a driver. Alternatively or additionally, weight(s) of one or more of the weight registers can be programmed by hardware, such as a weighting circuit configured to generate the data received by the arbiter 240 for assigning weights to the different types of cache requests. Weight(s) of weight registers can be set based on pipeline information, such information from a first in first out (FIFO) counter. Adjusting one or more weights in weight registers 320-326 can change the relative priority between different types of cache requests. For instance, when there are more depth requests to execute than color requests, depth weight registers can be assigned higher weights than color weight registers, according to one embodiment. The weights can be assigned values corresponding to different scenes or types of scenes, for example. Accordingly, priority can be customized to a particular scene or group of scenes.

The arbiter 240 can include one input counter for each different type of cache request. The input counters can count a number of cache requests granted. Accordingly, the input counters may be referred to as grant counters. As illustrated in FIG. 3, there can be four input counters, a depth read counter 330, a depth write counter 332, a color read counter 334, and a color write counter 336. Each of the input counters 330-336 can correspond to a different type of cache request. Each input counter 330-336 can count how many times a particular type of cache request has been processed. For example, each input counter 330-336 can track how many times each type of cache request has been received by the arbiter 240 and/or provided to the cache 250. The input counters 330-336 can track a number of times a cache request is granted by incrementing and/or decrementing a count value. It will be understood that, in some other embodiments, a different number of input counters 330-336 can be implemented and/or a different number of types of cache requests can be processed. When one of the input counters 330-336 reaches a particular count value, the relative priority of the cache requests can change. For instance, when a count value of a particular input counter is greater than or equal to a weight in a corresponding weight register, the corresponding type of cache request can have a lower priority relative to the other types of cache requests.

The arbiter 240 can also include an output counter 338 to count how many total cache requests have been processed by the arbiter 240. For example, the output counter 338 can track how many total cache requests are received by the arbiter 240 and/or provided by the arbiter 240 to the cache 250. In one embodiment (not illustrated), a summing circuit can sum the count values of the input registers 330-336 to generate a total count value in place of the output counter 338.

The input counters 330-336 and/or the output counter 338 of the arbiter can be reset in response to the arbiter 240 detecting one or more conditions. One example condition for resetting one or more counters of the arbiter 240 is that a specified number of cache requests have been processed by the arbiter 240. For example, the output counter 338 can count the number of cache requests provided to the cache 250 and the arbitration circuit 340 can reset the one or more counters in response to detecting that the output counter 338 has reached a particular count value. Accordingly, counters can be reset such that cache requests are balanced over a specified number of cache requests (for example, 10, 15, 20, or 30 cache requests). Another example condition for resetting one or more counters of the arbiter 240 is that one or more of the input counters 330-336 reaches a threshold count value. Such a threshold count value may be different for different input counters. In an example, when each input counter 330-336 of the arbiter 240 has a count value that is zero or greater than or equal to a weight in a corresponding priority register, all counters in the arbiter 240 can be cleared to an initial value, such as 0. Alternatively or additionally, when the total number of cache requests provided to the cache 250 is greater than or equal to the sum of all of the weights of the weight registers 320-326 of the arbiter 240 (for example, as counted by the output counter 338), all of the counters, including the input counters 330-336 and the output counter 338, can be cleared to an initial value, such as 0. As such, the arbiter 240 can cause values in one or more of counters 330-338 of the arbiter 240 to be cleared.

The arbitration circuit 340 can determine the relative priority among different types of cache requests. In certain implementations, the arbitration circuit 340 can be implemented by digital circuits. The arbitration circuit 340 can receive the different types of cache requests. A different input of the arbitration circuit 340 can receive each type of cache request. For example, as illustrated in FIG. 3, different inputs of the arbitration circuit 340 receive depth read, depth write, color read, and color write requests, respectively. The arbitration circuit 340 can assign priority to the different types of cache requests based on information from the weight registers 320-326, information form the input counters 330-336, information from the cache 250, or any combination thereof. The cache request with the highest priority can be provided to the cache 250. The arbitration circuit 340 can generate a select signal indicative of which type of cache request to provide to the cache 250. A multiplexer 360 can receive the select signal from the arbitration circuit 340 and provide a selected cache request to the cache 250 based on the select signal.

A priority queue can be initialized to set initial priorities. For instance, the priority queue can be initialized to have the following relative priorities: depth read having the highest priority, depth write having the next highest priority, color read having the next highest priority, and color write having the lowest priority. The priority queue can be set based at least partly on values assigned to values assigned to weight registers 320-326. The arbitration circuit 340 can include a state machine to implement the priority queue and/or other functionalities.

The arbitration circuit 340 can manage the priority queue. In one embodiment, the cache request received by the arbiter 240 of the type with the highest relative priority in the priority queue with a valid request, available location associated with the request in the cache 250 (for example, determined from information provided by the cache 250), and corresponding input counter having a count value less than the corresponding weight register value can be served by being provided to the cache 250. The priority queue of cache requests can then change by first moving the type of cache request served to the tail of queue. Then the leading type of cache request can be moved to of the tail of queue if its input counter has a count value that is equal to or greater than a value in its corresponding weight register. Requests at the head of the queue can be moved to the tail until the input counter of the leading type of cache request in the queue has a count value in its corresponding input counter that is less than a value in its corresponding weight register or all input counter count values are determined to be greater than or equal to values in their corresponding weight registers. It will be understood that in some other embodiments, different comparisons between values in a weight register and a counter can be performed. For instance, instead of checking if a count value is greater than a corresponding weight register value, the arbitration circuit can check if a count value is less than a corresponding weight value. The priority queue can alternatively or additionally move the leading type of cache request to the tail of queue if a location in the cache associated with the request is not available.

Figure 4:
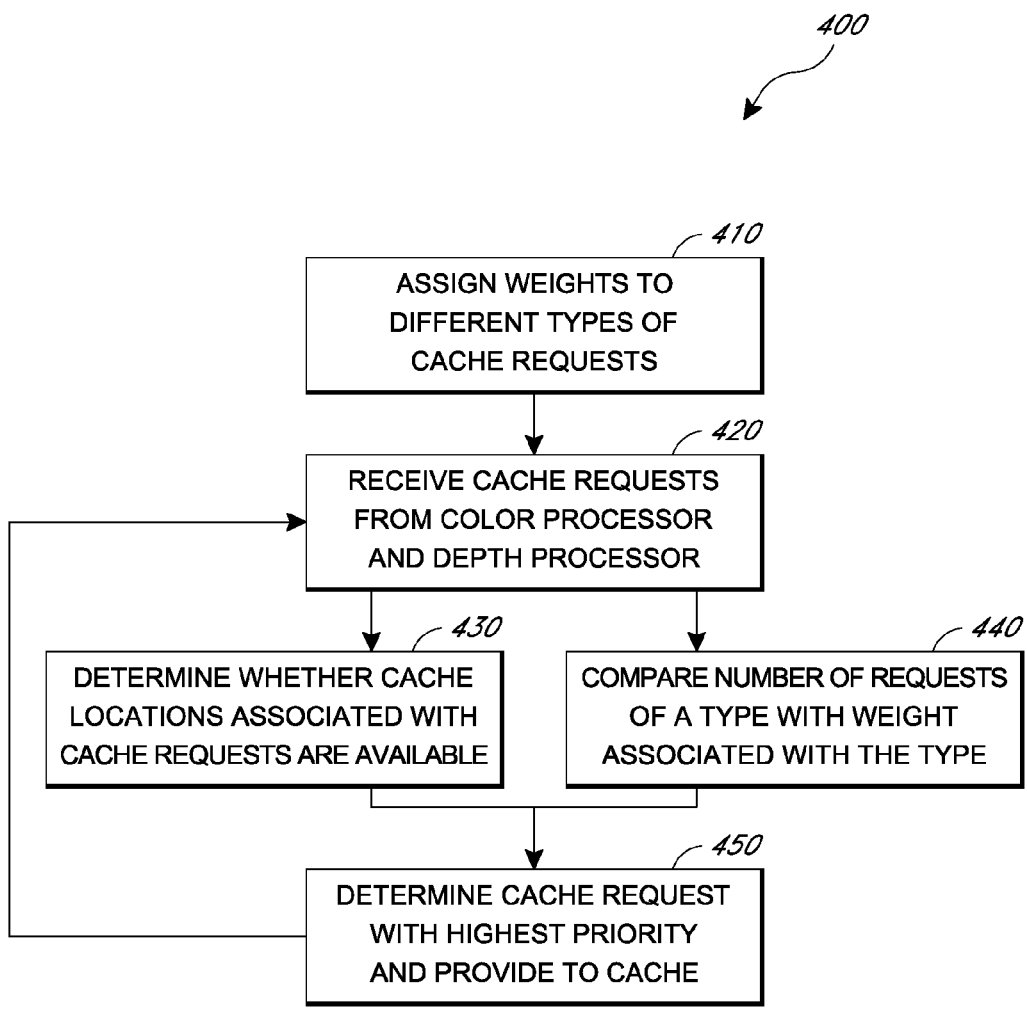
FIG. 4 is an illustrative flow diagram of a process of providing a cache request selected from a plurality of different types of cache requests to a cache, according to an embodiment.

FIG. 4 is an illustrative flow diagram of a process 400 of providing a cache request selected from a plurality of different types of cache requests to a cache, according to an embodiment. In the process 400, different types of cache requests are received and a selected cache request having a highest priority is provided to a cache. An arbiter in a GPU can perform some or all of the process 400 to selectively provide particular types of cache requests to a cache that is shared by a depth processor and a color processor. The process 400 can be implemented, for example, by any of the apparatus described herein, for example, the apparatus of FIGS. 1, 2, and/or 3. Moreover, any of the apparatus described herein can implement any combination of features of the process 400.

At block 410, weights associated with different types of cache requests can be assigned. For instance, weight registers can be programmed with values corresponding to a color read, a color write, a depth read, and a depth write, respectively. In this way, priority among various types of cache request can be initialized. The weight registers can be programmed at the direction of hardware, firmware, or any combination thereof. The weights can be programmed with different values after initial programming. The values of the weights can be adjusted after receiving cache requests in some implementations. Assigning different weight values can adjust the relative priority of the different types of cache requests.

Cache requests can be received at block 420. For instance, an arbiter can receive cache requests from a depth processor and cache requests from a color processor. As such, the arbiter can receive different types of cache requests from different processors and/or different types of cache requests from the same processor. The different types of cache requests can be received at different input contacts of the arbiter. When two or more different types of cache requests are received by the arbiter, the arbiter can determine which type of request has the highest relative priority and then provide the type of request with the highest relative priority to the cache first.

Whether cache locations associated with cache requests are available can be determined at block 430. For instance, an arbiter can receive information from the cache indicating whether or not a cache location associated with a read or a write to the cache is available. More specifically, in certain embodiments, the arbiter can receive information indicating whether cache locations associated with one or more of a color read, a color write, a depth read, or a depth write are available. The arbiter can then determine whether a cache location associated with a particular cache request is available.

At block 440, a number of cache requests processed of a particular type of cache request can be compared with a weight associated with the particular type. In one example, a counter can track each time the particular type of cache request is processed, and a count value of the counter can be compared to a weight stored in a corresponding weight register for the particular type of cache request. Such comparisons can be performed for one or more of the different types of cache requests received by an arbiter. The counters can be cleared in response to the arbiter detecting a condition, for example, as discussed above.

The type of cache request determined to have the highest priority can be provided to the cache at block 450. The highest priority can be determined based on whether an associated location in the cache is available and/or based on a comparison of a count of a number of cache requests of a particular type have been processed with a weight of the particular type of cache request. The highest priority can be determined, for example, by determining if a request is valid, checking if a cache location associated with the request is available, and then comparing a count value associated with a type of cache request at the front of a priority queue with a corresponding value in a weight register. For instance, a count value can initially be compared with a corresponding value in a weight register for a type of cache request at a front of the priority queue. Then if such a comparison indicates not to provide the type of cache request to the cache, a count value can be compared with a corresponding value in a weight register for a different type of cache request that is next in the priority queue. This can be iterated until a comparison of a count value with corresponding value in a weight register indicates to provide a particular type of cache request to the cache.

After a cache request has been provided to the cache, the process 400 can continue receiving cache requests, determining whether locations associated with such requests are available, comparing numbers of requests of particular types with corresponding weights, providing cache requests to the cache, or any combination thereof.

Some of the embodiments described above have provided examples in connection with a graphics processing unit. The principles and advantages of the embodiments of technology discussed herein are operational with numerous general purpose or special purpose computing system environments or configurations. Examples of such computing systems, environments, and/or configurations that may be suitable for use with the technology described herein include, but are not limited to, personal computers, server computers, hand-held or laptop devices, tablet computers, multiprocessor systems, processor-based systems, programmable consumer electronics, network PCs, minicomputers, mainframe computers, distributed computing environments that include any of the above systems or devices, and the like.

Those of skill in the art will further appreciate that the various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with any suitable general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Moreover, a processor can have a single core or multiple cores. In addition, the processor may be any a special purpose processor such as a graphics processor.

In one or more example embodiments, the functions and methods described may be implemented in hardware, software, or firmware executed on a processor, or any combination thereof. If implemented in software, the functions may be stored on non-transitory computer-readable storage. By way of example, and not limitation, such non-transitory computer-readable storage can comprise RAM, ROM, EEPROM, CD-ROM or other optical disk storage, magnetic disk storage or other magnetic storage devices, or any other non-transitory medium that can be used to store desired program code in the form of instructions or data structures and that can be accessed by a computer. Moreover, it will be understood that the methods discussed herein are performed at least partly by physical circuitry. Accordingly, the claims are not intended to cover purely metal processes or abstract ideas. Indeed, the disclosed techniques are not applicable to mental steps, and are not performed within the human mind or by a human writing on a piece of paper.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled," "connected," and the like, as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments is not intended to be exhaustive or to limit the invention to the precise form disclosed above. While specific embodiments of, and examples for, the invention are described above for illustrative purposes, For example, while processes or blocks are presented in a given order, alternative embodiments may perform routines having acts, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While certain embodiments have been described, these embodiments have been presented by way of example only, and are not intended to limit the scope of the disclosure. For example, various equivalent modifications are possible within the scope of the invention, as those skilled in the relevant art will recognize. Moreover, the elements and acts of the various embodiments described above can be combined to provide further embodiments. Indeed, the methods, systems, apparatus, and articles of manufacture described herein may be embodied in a variety of other forms; furthermore, various omissions, substitutions and changes in the form of the methods, systems, apparatus, and articles of manufacture described herein may be made without departing from the spirit of the disclosure.

I claim:

1. An apparatus comprising:
   a cache configured to store data; and
   an arbiter comprising electronic hardware, the arbiter configured to:
      assign weights to different types of cache requests based on data received by the arbiter, the different types of cache requests including at least a first type of cache request and a second type of cache request;
      receive a first request to access the cache from a depth processor, the first request being of the first type of cache request;
      receive a second request to access the cache from a color processor, the second request being of the second type of cache request;
      determine which of the received requests has a highest priority based at least partly on the weights associated with the first type of request and the second type of request; and
      provide the cache with the received request determined to have the highest priority.

2. The apparatus of claim 1, wherein the arbiter is configured to determine the highest priority based at least partly on an indication of whether a location in the cache associated with the first request is available.

3. The apparatus of claim 1, wherein the arbiter comprises a plurality of input counters, each of the plurality of input counters configured to count a number of requests of a respective one of the different types of cache requests has been processed by the arbiter.

4. The apparatus of claim 3, wherein the arbiter is configured to determine the highest priority based at least partly on a comparison of a selected one of the weights assigned to different types of cache requests and the number of requests counted by the corresponding input counter.

5. The apparatus of claim 3, wherein the arbiter comprises an output counter configured to track how many requests have been provided to the cache.

6. The apparatus of claim 3, wherein the arbiter is configured to clear the input counters in response to detecting a condition.

7. The apparatus of claim 1, wherein the apparatus comprises a graphics processing unit, the graphics processing unit comprising the cache, the arbiter, the depth processor, and the color processor.

8. The apparatus of claim 1, wherein the different types of cache requests comprise a color read, a color write, a depth read, and a depth write.

9. The apparatus of claim 1, further comprising a weighting circuit configured to generate the data received by the arbiter for assigning weights to the different types of cache requests.

10. The apparatus of claim 1, wherein the data received by the arbiter for assigning weights to the different types of cache requests is generated by a driver.

11. An apparatus comprising:
    a cache configured to store data;
    arbitration means for determining a relative priority of different types of cache requests based at least partly on weights associated with the different types of cache requests and counts of requests of the different types of cache requests, said arbitration means configured to provide the different types of cache requests to the cache based on the relative priority;
    a color processor configured to provide cache requests to the arbitration means; and
    a depth processor configured to provide cache requests to the arbitration means.

12. An electronically-implemented of providing a selected cache request to a cache, the method comprising:
    receiving, from a depth processor and from a color processor, a plurality of different types of cache requests to access a cache shared by the depth processor and the color processor;
    determining a selected cache request of received cache requests has a highest priority of the received cache requests based at least partly on one or more weights associated with the different types of cache requests and one or more counts associated with the different types of cache requests; and
    providing the selected cache request to the cache prior to providing other cache requests of the received cache request to the cache.

13. The method of claim 12, wherein the plurality of different types of cache requests comprises a color read, a color write, a depth read, and a depth write.

14. The method of claim 12, further comprising configuring the one or more weights.

15. The method of claim 14, wherein said configuring is performed at the direction of a driver.

16. The method of claim 12, wherein determining the relative priority of the different types of cache requests is based at least partly on whether a location in the cache associated with at least one of the received requests is available.

17. The method of claim 12, further comprising generating the counts of cache requests of each of the different types of cache requests with a counter for each of the different types of cache requests.

18. The method of claim 17, further comprising clearing the counts of the number of cache requests of the different types based at least partly on detecting a condition.

19. The method of claim 18, wherein the condition is indicative of a predetermined number of cache requests being received.

20. Non-transitory computer-readable storage comprising instructions that, when executed, direct a graphics processing unit to perform a method, the method comprising:
    selecting, based at least partly on weights associated with different types of cache requests and counts associated with the different types of cache requests, a cache request from a plurality of the different types of cache requests to access a cache, wherein the different types of cache requests are provided by a color processor and a depth processor; and providing the selected cache request to the cache.

22. The non-transitory computer-readable storage of claim 20, wherein the method further comprises setting the weights in registers of an arbiter, and wherein the weights are configurable.

22. The non-transitory computer-readable storage of claim 21, wherein selecting is based at least partly on whether a location in the cache associated with the cache requests is available.

* * * * *